United States Patent [19]
Kerdjoudj et al.

[11] Patent Number: 6,054,785
[45] Date of Patent: Apr. 25, 2000

[54] COMPACT MINIATURE MOTOR

[75] Inventors: Mohamed Kerdjoudj, Chicago; A.N. (Tom) Tsergas, Wood Dale, both of Ill.

[73] Assignee: Molon Motor & Coil Corporation, Rolling Meadows, Ill.

[21] Appl. No.: 09/315,852

[22] Filed: May 21, 1999

[51] Int. Cl.[7] ................................................. H02K 33/10
[52] U.S. Cl. ........................ 310/40 MM; 310/83; 310/99; 446/445; 29/893.37; 74/425
[58] Field of Search .................. 310/40 MM, 83, 310/99, 80, 114; 446/445, 446, 457, 465; 29/893.37; 74/425

[56] References Cited

U.S. PATENT DOCUMENTS

| | | | |
|---|---|---|---|
| 3,243,917 | 4/1966 | Giammarino et al. | 446/446 |
| 3,486,271 | 12/1969 | Feikema | 446/445 |
| 3,716,110 | 2/1973 | Fonda | 180/405 |
| 3,747,265 | 7/1973 | Gagnon | 446/425 |
| 3,772,825 | 11/1973 | Gagnon | 446/425 |
| 3,810,515 | 5/1974 | Ingro | 180/54.2 |
| 3,964,206 | 6/1976 | Bernhard | 446/455 |
| 4,565,538 | 1/1986 | Kennedy et al. | 446/427 |
| 4,754,830 | 7/1988 | Morishita et al. | 180/446 |
| 5,004,077 | 4/1991 | Carlson et al. | 188/2 D |
| 5,172,605 | 12/1992 | Schwartz | 74/421 A |
| 5,256,921 | 10/1993 | Pruis et al. | 310/68 B |
| 5,404,060 | 4/1995 | Nakahashi et al. | 310/83 |
| 5,446,326 | 8/1995 | Scheider | 310/83 |
| 5,734,210 | 3/1998 | Keutz | 310/49 R |
| 5,747,903 | 5/1998 | Klingler | 310/75 R |

*Primary Examiner*—Nestor Ramirez
*Assistant Examiner*—Joseph Waks
*Attorney, Agent, or Firm*—Oblon, Spivak, McClelland, Maier & Neustadt, P.C.

[57] ABSTRACT

A compact miniature motor includes a DC motor, a worm gear, a pinion transfer gear, at least one cluster gear, an output gear, and an output shaft. A socket may be used to accept the output shaft. The gears form a gear train that wraps tightly around the DC motor in the shape of a capital letter J. Inverted trunnions stabilize the pinion transfer gear by extending longitudinally inside thereof. Acoustical chambers packed with grease suppress noise generated by the gear train. A PC board is also provided and has components for rectifying, filtering for constant DC, and modifying AC voltage before passing it to energize the DC motor. The output shaft may drive a product mover for beverage cans inside a vending machine or another type of electromechanical unit requiring the application of high torque.

6 Claims, 3 Drawing Sheets

COMPACT MINIATURE MOTOR

BACKGROUND OF THE INVENTION

1. Field of the Invention

This invention relates to machine elements and mechanisms generally, but more particularly to miniaturized motors.

2. Description of the Related Art

Existing designs for canned drink vending machine motors that operate at or above 100 inch-pounds are characterized by heavy duty shaded pole motors, zinc gear boxes, all metal gears with sleeve or needle bearings, and oversized installation envelopes.

In addition, the cost and weight for such designs are among the highest for subfractional horsepower gear motors. For example, present designs for vending machines include add-on brackets for custom mounting. Moreover, it is generally known that shaded pole motors are among the most inefficient types of motors in general use. Exemplary prior art devices are discussed below.

U.S. Pat. No. 5,446,326 issued to Scheider on Aug. 29, 1995, for a vending machine gear motor including a plastic gear box. As shown in FIG. 1 of his U.S. Patent, the gear motor of Scheider comprises a gear box 11 having a generally hollow plastic gear box housing 12, a gear train 14 mounted therein, and an electronically insulating cover 13.

U.S. Pat. No. 5,256,921 issued to Pruis et al. on Oct. 26, 1993, for a gear motor with a rotary switch. The gear motor has an output shaft for driving a dispensing mechanism of a vending machine. As shown in FIGS. 2 and 3 of their U.S. Patent, the gear motor of Pruis et al. includes an electric motor 12 mounted on a printed circuit board 13 and also includes an output shaft 14 which drives a conventional gear reduction unit 16.

U.S. Pat. No. 5,404,060 issued to Nakahashi et al. on Apr. 4, 1995, for a miniature motor with a worm reduction gear. The miniature motor includes a motor section 1 which transmits torque generated from a motor shaft 3 to a worm 4, then to a helical gear 5 in a reduction gear section 2, and eventually to an output shaft 6.

U.S. Pat. No. 5,172,605 issued to Schwartz on Dec. 22, 1992, and is assigned to the same assignee as the present invention. Schwartz discloses an electric motor gearbox for a vending machine. The gearbox has four main parts: a housing, a minimotor, a printed circuit board, and an assembly of plastic gears.

Various other gearing mechanisms relating to relatively small motors of general interest are disclosed in U.S. Pat. No. 5,747,903 issued to Klingler on May 5, 1998 and in U.S. Pat. No. 5,734,210 issued to Keutz on Mar. 31, 1998.

Despite these recent developments, it remains a problem in the prior art to develop a compact miniature motor with high torque for a gearcase which makes efficient use of space in a vending machine.

SUMMARY OF THE INVENTION

The present invention features unique improvements in the use of engineering plastics. The layout of components is compact, taking advantage of a right angle drive which, in this particular case, is a first-stage worm gear.

This arrangement keeps a motor compact inside a gearbox which makes efficient use of space in a vending machine, and any other unit requiring an application of high torque in a small space.

A gear train within a main casing has standard available gears. However, the transfer stage from the worm gear down to a plurality of cluster gears within the gearbox is flexibly arranged for a variety of gear ratios. This flexibility is introduced by adjusting the ratio between the first-stage worm gear with single, double or quadruple threads and a double pinion transfer gear.

A metallic output shaft is supported directly within the gearbox without introducing additional bearings. The lifetime of the gearbox for directly supporting the output shaft is very predictable. Thus, this novel arrangement reduces costs over the lifetime of the gearbox quite noticeably.

A number of features support quiet operation in addition to the first-stage worm gear. The gearbox has close envelope contours to retain grease in the gear train. This close envelope also aids quiet operation. A plurality of acoustical chambers surround the gear train and insulate against noise transfer. In addition, the motor is covered with an enclosure that further insulates against noise transmission, dust, moisture, etc.

Unique to the present invention is the double pinion transfer gear that is supported by inverted trunnions. Instead of extroverted trunnions supports used in the prior art, the transfer gear of the present invention has internal space provided at its ends for supports that extend inside the transfer gear, thus shortening the unsupported length of the transfer gear, when compared to the prior art which uses transfer gears that are virtually unsupported except at the very tips of their ends. Consequently, the invention provides a more stable gear mesh operation. Also, a motor cover provides outside support for the transfer gear at one end of the worm gear.

The rating of the gear motor can have a direct current (DC) voltage of either 12, 24, 36 or 48 volts. Furthermore, a printed circuit (PC) board is mounted on the gear motor to rectify from either 120 or 240 alternating circuit (AC) voltage to DC voltage. The PC board includes components for rectifying, filtering for constant DC, and limiting overloads with a positive temperature coefficient (PTC) resister. A reversing switch is also used. The PC board is connected to AC voltage by a header mounted thereon.

Materials for both the gearbox and the cover are acrylonitrile butadinene styrene (ABS) copolymers or other engineering plastics with or without reinforcement in the matrix. Gears are made of delrin, nylon or other engineering plastics. Upper stage gears are formed from powdered metal or fine metallic blanks. Thus, the output shaft, its cross pin and other elements for transmitting torque are fabricated out of either powdered metal or metallic blanks. Also, a socket may be used for coupling the output shaft.

Grease is selected from the high performance synthetic greases with a tolerance for both high and low temperatures. The poly-alpha-olefins have been found satisfactory in this regard.

A key advantage of the present invention is that no anti-back-drive brake is necessary because of the use of the first-stage worm gear which typically cannot be back driven.

Thus, it is a primary object of the present invention to provide a vending machine with miniature motors that are compact, have noise control features, have higher efficiencies when compared to shaded pole types, and are inexpensive to construct.

A secondary object of the present invention is to provide a compact machine motor with a rectifier circuit on its PC board.

A tertiary object of the present invention is to provide a compact motor for custom mounting to a vending machine by direct foot mounts.

BRIEF DESCRIPTION OF THE DRAWINGS

A more complete appreciation of the invention and many of its attendant advantages will be readily obtained as the invention becomes better understood by reference to the following detailed description when considered in connection with the accompanying drawings.

DETAILED DESCRIPTION OF THE PREFERRED EMBODIMENT

Figure 1:
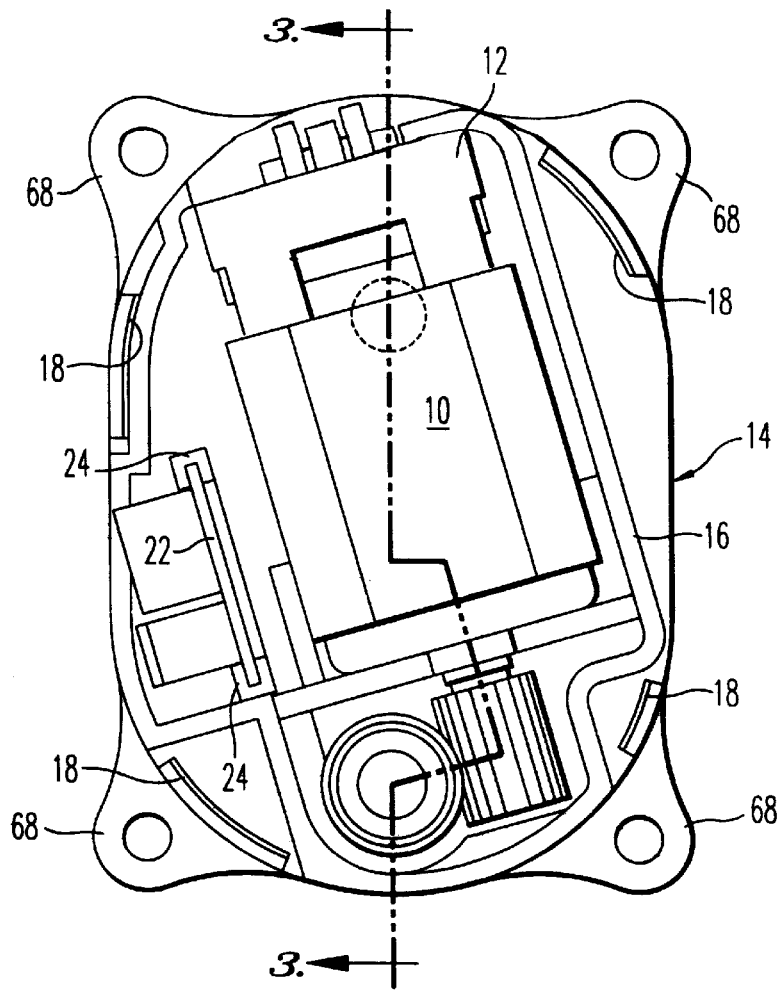
FIG. 1 is a cutaway top plan view of a compact miniature motor of the present invention inside gearbox.

Referring now to the drawings, like reference numerals designate identical or corresponding parts throughout the several views. Features of the invention will become apparent in the course of the following description of a preferred embodiment which is given only for illustration of the invention and which is not intended to be limiting thereof.

In FIG. 1, a DC motor 10 has a permanent magnet 12 attached thereto inside a gearbox 14. The permanent magnet 12 produces an electromagnetic field necessary for operating the DC motor 10. A first cover 16 protects the motor 10 inside the gearbox 14. A plurality of curved corner tabs 18 interlock the gearbox 14 to a second cover (not shown in FIG. 1). A PC board 22 is retained inside the gearbox 14 by molded plastic guides 24. The gearbox 14 has a plurality of extended corner feet 68 which allow the entire unit to be custom mounted to the device being operated.

Figure 2:
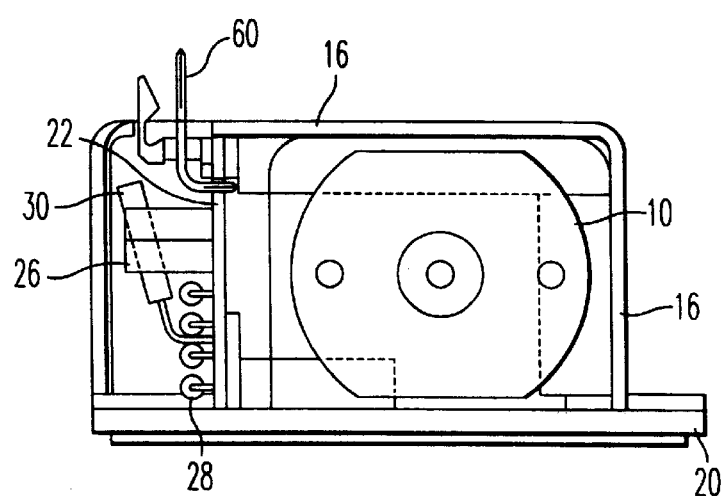
FIG. 2 is a side elevational view of the compact miniature motor inside the gearbox.

In FIG. 2, the second cover 20 is shown underneath the motor 10 which is also protected overhead by the first cover 16. The second cover 20 is interlocked to the gearbox 14 of FIG. 1 by the tabs 18, not shown in FIG. 2 but seen in FIG. 1. The PC board 22 has attached thereto an electrolytic capacitor 26 for filtering constant DC, a plurality of diodes 28 forming a full-wave bridge, and a motor fuse 30 which is preferably a PTC resistor.

Figure 3:
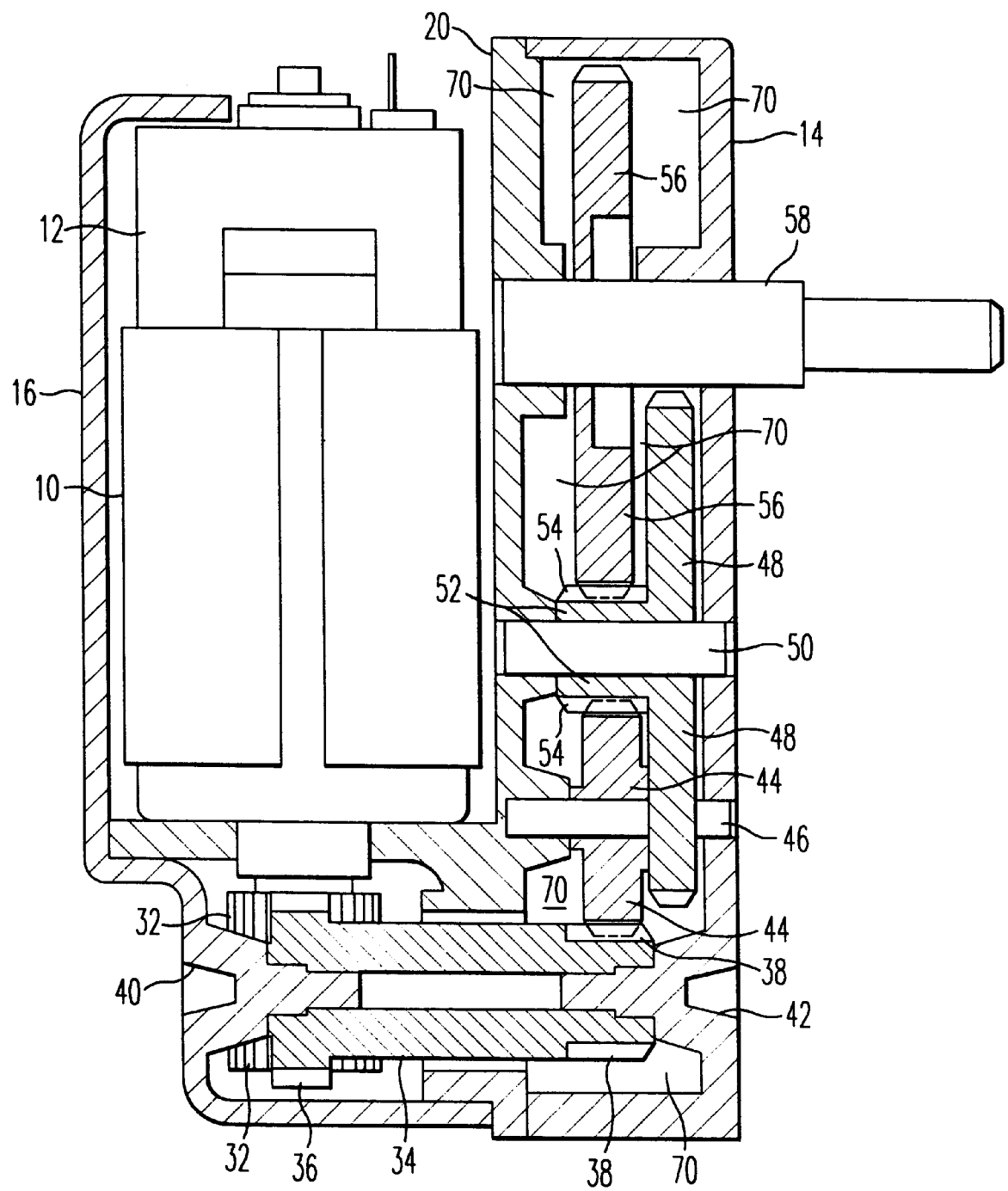
FIG. 3 is a cross-sectional view taken along line 3—3 of FIG. 1.

In FIG. 3, the first cover 16 is shown protecting the motor 10 and the permanent magnet 12 which may be inside the motor 10. The second cover 20 is also shown protecting the gearbox 14. A first-stage worm gear 32 is driven directly by the motor 10 at one end. The worm gear 32 drives at a right angle a molded double pinion transfer gear 34. At one end of the transfer gear 34, a first set of teeth 36 mesh with the worm gear 32. At another opposite end of the transfer gear 34, a second set of teeth 38 are formed in a side thereof and change rotation from a right angle to a plurality of gears which are aligned parallel to the first-stage worm gear 32. A pair of internal trunnions 40 and 42 make the transfer gear 34 stable by extending therein and engaging longitudinally the inside thereof from opposite ends. The one trunnion 40 is molded at one end to the first cover 16 while the other trunnion 42 is molded at its opposite end to the gearbox 14. The teeth 38 on the transfer gear 34 mesh with a first cluster gear 44 which has a first gear pin 46 for stabilizing the first cluster gear 44 between the gear box 14 and the second cover 20. In turn, the first cluster gear 44 drives a second cluster gear 48 which has a second gear pin 50 for likewise stabilizing the second cluster gear 48 between the gearbox 14 and the second cover 20. The second cluster gear 48 has a short shaft portion 52 with teeth 54 which engage on one side with the first cluster gear 44 and which engage on an opposite side with an output gear 56. This output gear 56 is fixed around and drives an output shaft 58 at a right angle. Thus, a gear train extending from the worm gear 32 to the transfer gear 34 to the first cluster gear 44 to the second cluster gear 48 to the output gear 56 is compact because it wraps tightly around the motor 10 in the shape of the capital letter J.

Noise generated by the gear train is suppressed by grease packed in a plurality of acoustical chambers 70 which are formed between the gearbox 14 and the second cover 20. The output shaft 58 drives a product mover for canned beverages inside a vending machine or any other electromechanical unit requiring the application of high torque.

Figure 4:
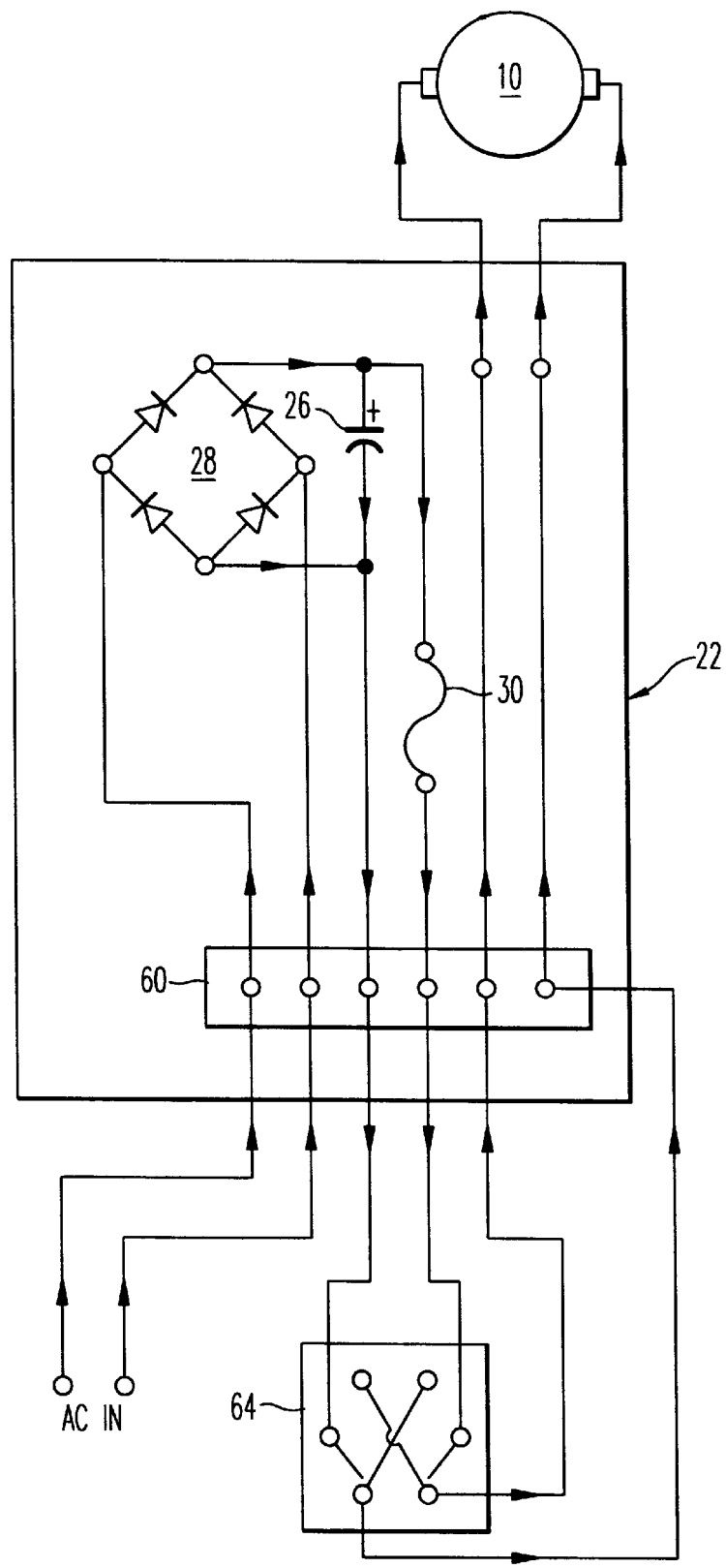
FIG. 4 is a schematic view of a PC board wired to the compact miniature motor.

In FIG. 4, AC voltage enters the PC board 22 at one end and is received by a header 60 mounted on the PC board 22 before exiting to energize the motor 10. After leaving the header 60, the AC voltage passes through the plurality of diodes 28, which in this case number four and which form a full-wave bridge to rectify the AC voltage. After leaving the plurality of diodes 28, the voltage is processed by the electrolytic capacitor 26 which is mounted to the PC board 22 and which filters for constant DC. The voltage then goes through the PTC resistor 30 which is also mounted to the PC board 22 and which functions as the motor fuse 30 to prevent overloads. The voltage passes again through the header 60 before reaching a switch 64 for reversing the current back through the header 60 and out to the motor 10. The reversing switch 64 is mounted outside the PC board 22 to the first cover 16, not shown in FIG. 4 but seen in FIG. 2.

Numerous modifications and variations of the present invention are possible in light of the above teachings. Thus, it is to be understood that, within the scope of the appended claims, the invention may be practiced otherwise than as specifically described herein.

What is claimed as new and desired to be secured by Letters Patent of the United States is:

1. A compact miniature motor, comprising:
    a DC motor with a permanent magnet attached thereto;
    a worm gear driven at one end by the DC motor;
    a pinion transfer gear engaging at one end at a right angle with the worm gear;
    at least one cluster gear engaging at a right angle with another end of the pinion transfer gear;
    an output gear driven by the at least one cluster gear; and
    an output shaft engaging at a right angle with the output gear;
    whereby the worm gear, the pinion transfer gear, the at least one cluster gear and the output gear form a gear train that wraps tightly around the DC motor in the shape of a capital letter J.

2. A compact miniature motor, according to claim 1, further comprising:
    a first cover for protecting the DC motor;
    a gearbox for containing the gear train; and
    inverted trunnions, connected at one end to the first cover and connected at an opposite end to the gearbox, for stabilizing the pinion transfer gear.

3. A compact miniature motor, according to claim 2, wherein:
    said inverted trunnions extend longitudinally inside opposite ends of the pinion transfer gear.

4. A compact miniature motor, according to claim 2, further comprising:
    a second cover for protecting the gear train; and at least one acoustical chamber, packed with grease and formed between the gearbox and the second cover, for suppressing noise generated by the gear train.

5. A compact miniature motor, according to claim 2, further comprising:

a PC board attached to the first cover.

6. A compact miniature motor, according to claim 5, further comprising:

a header, mounted on the PC board, for receiving AC voltage;

a plurality of diodes electrically connected to the header and formed into a full wave bridge for rectifying the AC voltage;

an electrolytic capacitor, mounted on the PC board, for filtering for constant DC;

a PTC resistor, mounted on the PC board, for preventing overloads; and a switch, mounted on the first cover, for reversing current back through the header and out to the DC motor;

whereby the AC voltage is rectified, filtered for constant DC, and modified to prevent overloads before exiting the PC board to energize the DC motor.

\* \* \* \* \*